US005845312A

United States Patent [19]
Kimura et al.

[11] Patent Number: 5,845,312
[45] Date of Patent: Dec. 1, 1998

[54] SYSTEM FOR ACCESSING DYNAMIC RANDOM ACCESS MEMORY WHERE THE LOGIC/CONTROL CIRCUIT TEMPORARILY STOPS UPON WORD LINE SWITCHING

[75] Inventors: Tohru Kimura; Yoshiharu Aimoto; Yoshikazu Yabe, all of Tokyo, Japan

[73] Assignee: NEC Corporation, Tokyo, Japan

[21] Appl. No.: 673,315

[22] Filed: Jun. 28, 1996

[30] Foreign Application Priority Data

Jun. 30, 1995 [JP] Japan ................................. 7-187843

[51] Int. Cl.⁶ ........................................... G06F 13/00
[52] U.S. Cl. .......................... 711/105; 711/154; 711/167
[58] Field of Search ................................. 711/105, 154, 711/167

[56] References Cited

U.S. PATENT DOCUMENTS

| | | | |
|---|---|---|---|
| 4,414,664 | 11/1983 | Greenwood | 371/37.3 |
| 5,608,688 | 3/1997 | Park | 365/233.5 |
| 5,682,354 | 10/1997 | Manning | 365/233.5 |

FOREIGN PATENT DOCUMENTS 58-94183  6/1983  Japan .

OTHER PUBLICATIONS

Jim Handy, The Cache Memory Book, Academic Press, Inc., 1993, Section 1.3.1 and Glossary, 1993.

Yamashita et al., "Integrated Memory Array Processor LSI with 64 Processing Elements and 2Mb SRAM", IEEE International Solid–State Circuits Conference, vol. 37, FA15.2, (1994) pp. 260–261.

Gwennap, "Intel's P6 Uses Decoupled Superscalar Design: Next Generation of x86 Integrates L2 Cache in Package with CPU", Microprocessor Report, (1995) pp. 9–15.

Primary Examiner—Tod R. Swann
Assistant Examiner—Esteban A. Rockett
Attorney, Agent, or Firm—Foley & Lardner

[57] ABSTRACT

A memory access system including a logic/control circuit, a memory, an address bus connecting the logic/control circuit and the memory and an address transition detector circuit provided on address lines constituting the address bus, the address transition detector circuit detecting a memory access signal requesting memory access involving word line switching in the memory out of memory access signals transmitted from the logic/control circuit to the memory through the address lines and outputting a detection signal, and the logic/control circuit receiving input of the detection signal from the address transition detector circuit to temporarily stop its operation until the memory access is completed.

13 Claims, 3 Drawing Sheets

SYSTEM FOR ACCESSING DYNAMIC RANDOM ACCESS MEMORY WHERE THE LOGIC/CONTROL CIRCUIT TEMPORARILY STOPS UPON WORD LINE SWITCHING

BACKGROUND OF THE INVENTION

1. Field of the Invention

The present invention relates to a system for accessing a semiconductor memory for use in a computer and, more particularly, to a system for accessing a DRAM (Dynamic Random Access Memory) used as a semiconductor memory.

2. Description of the Related Art

DRAM is most widely used as a main storage device of a computer because of its low manufacturing costs. While in a computer, a clock cycle rate of a processor or a controller has been increased, improvement for a DRAM has been made mostly in its storage capacity but not in operating speed. Random accessing speed therefore remains low.

Processors and the like access a desired address in a DRAM through addressing. Within a specific range, they are capable of randomly accessing any different designated addresses at a high speed by means of a page mode or the like. In a fixed access pattern, therefore, elaborated addresses for storing data allow high accessing speed to be achieved. In a situation that addressing is executed in any pattern, however, the whole system should be designed to meet a lowest-rate cycle on the assumption that a DRAM is accessed in the lowest-rate cycle because page mode or other means can not be always used.

DRAM will be further detailed. Data stored in memory cells are simultaneously read as many as the number of memory cells which are connected to a word line at the time of word line selection and the read data is reserved in a sense amplifier circuit unit. For reading other data without changing a word line to be selected after the first data reading, it is only necessary to read the data reserved in the sense amplifier circuit unit, which enables high-speed reading.

DRAM reading operation is a destructive reading without keeping stored information. When data kept in a memory cell is read, operation is necessary for rewriting the data in the memory cell. Therefore, for reading data stored in a memory cell connected to another word line, it is necessary to rewrite once read data in the memory cell and then switch a word line to be selected to read target data.

At the time of newly reading data, if switching of a word line is needed for accessing a target address (access through a word decoder), access will be conducted at a low speed and if no switching of a word line is needed (access through a column decoder), high-speed access will be possible.

As to large-capacity data processing such as image data processing, high-speed access is possible by synchronous operation or other means only in a case of such serial access to sequential addresses as in picture transfer. In a case of random access to a target address, however, access will be inevitably conducted at a low speed. To cope with random addresses to be accessed, the system has been designed on the assumption that memory access is conducted in a lowest-rate cycle, or the system has been designed to be adapted to high-speed access such that it detects address change which inevitably leads to low-speed access, that is, access to an address requiring word line switching, to interleave a wait cycle for waiting for the end of the low-speed access into a processing cycle of the system.

One of the techniques for interleaving a wait cycle into a processing cycle of a system at the time of low-speed access is disclosed, for example, in Japanese Patent Laying-open No. 58-94183, entitled "Memory Paging Address Conversion System". Recited in the literature is a technique for controlling a device with a memory paging function including comparison means for comparing a previous access page number and a page number to be newly accessed, such that when access by a memory paging table finds disagreement between the previous and the present access page numbers, a necessary wait cycle is interleaved to extend a memory access cycle based on a comparison output from the comparison means.

As described in the foregoing, a conventional memory access system in which a DRAM is randomly accessed should be designed to be adapted to low-speed access and as a result, even when high-speed access is possible, processing is conducted at a speed meeting low-speed access. The system therefore has low efficiency because no improvement can be made in a processing speed.

On the other hand, the conventional technique for individually interleaving a wait cycle in a case of low-speed access to wait for the end of the low-speed access, with a system itself designed to be adapted to high-speed access, has a shortcoming that execution of a wait cycle at the time of wait for low-speed access involves useless power consumption. This is a serious problem, in particular, for a battery-driven portable electronic equipment etc.

SUMMARY OF THE INVENTION

A first object of the present invention is to provide a memory access system whose average processing speed as a whole can be improved by stopping, when a memory access signal is generated requesting low-speed access involving alteration of a word line in a memory out of memory access signals, operation of a logic/control circuit until the access is completed to individually wait for the end of access for coping with low-speed access even if the system is designed to be adapted to high-speed access involving no word line switching.

A second object of the present invention is to provide a memory access system allowing reduction of power consumption by stopping operation of a logic/control circuit, etc. when in waiting for the end of low-speed access, unlike a system in which a predetermined wait cycle is interleaved into a processing cycle to wait for the end of low-speed access.

A third object of the present invention is to provide a memory access system in which memory access signals generated between generation of a memory access signal requesting low-speed access and stoppage of operation of a logic/control circuit are pooled, thereby avoiding loss of the memory access signals to prevent erroneous operation etc. resulted from the loss.

A fourth object of the present invention is to provide a memory access system capable of waiting, when a plurality of logic/control circuits are provided and a memory access signal requesting low-speed access involving word line switching is generated from any of the logic/control circuits, all the logic/control circuits for the end of low-speed access, thereby preventing erroneous control of the entire system caused by stoppage of operation of a part of the logic/control circuits.

A fifth object of the present invention is to provide a memory access system whose average processing speed as a whole can be further improved by reordering output of memory access instructions in a logic/control circuit to reduce generation of the number of memory access signals requesting low-speed access involving word line switching.

A sixth object of the present invention is to provide a memory access system whose average processing speed as a whole can be further improved by providing a latch circuit on a word line of a memory to expand a range of memory cells which are high-speed accessible by interleaving operation.

According to one aspect of the invention, a memory access system comprises:

a logic/control circuit;

a memory;

an address bus connecting the logic/control circuit and the memory; and an address transition detector circuit provided on address lines constituting the address bus;

said address transition detector circuit detecting a memory access signal requesting memory access involving word line switching in said memory out of memory access signals transmitted from said logic/control circuit to said memory through the address lines and outputting a detection signal, and said logic/control circuit receiving input of a detection signal from said address transition detector circuit to temporarily stop its operation until the memory access is completed.

In the preferred construction, the address bus includes a first address line for transmitting a memory access signal requesting memory access involving word line switching in said memory, and a second address line for transmitting a memory access signal requesting memory access involving no word line switching, and the address transition detector circuit detects a memory access signal transmitted through said first address out of the address lines constituting said address bus and outputs said detection signal.

In another preferred construction, the memory access system further comprises a plurality of combinations provided in parallel of said logic/control circuit, said memory, said address bus and said address transition detector circuit, said plurality of address transition detector circuits transmitting a detection signal to all of said logic/control circuits.

In another preferred construction, the memory access system further comprises a buffer provided on said address bus for receiving input of a detection signal from said address transition detector circuit circuit and pooling memory access signals generated after the reception of the detection signal.

Also, the memory access system further comprises a plurality of combinations provided in parallel of said logic/control circuit, said memory, said address bus, said address transition detector circuit and a buffer provided on said address bus for receiving input of a detection signal from said address transition detector circuit and pooling memory access signals generated after the reception of the detection signal, said plurality of address transition detector circuit transmitting a detection signal to all of said logic/control circuits and said buffers.

In the above-mentioned construction, the logic/control circuit includes a reservation station for reserving said memory access signals, and an address reorder buffer for reordering the memory access signals reserved in said reservation station to group memory access signals requesting memory access involving no word line switching in said memory.

In the above-mentioned construction, the memory access system further comprises a plurality of combinations provided in parallel of said logic/control circuit, said memory, said address bus and said address transition detector circuit, wherein the plurality of address transition detector circuits each transmits a detection signal to all the logic/control circuits, and the said plurality of logic/control circuits each includes a reservation station for reserving said memory access signals, and an address reorder buffer for reordering the memory access signals reserved in said reservation station to group memory access signals requesting memory access involving no word line switching in said memory.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

Preferred embodiments of the present invention will be described in detail with reference to the accompanying drawing.

Figure 1:
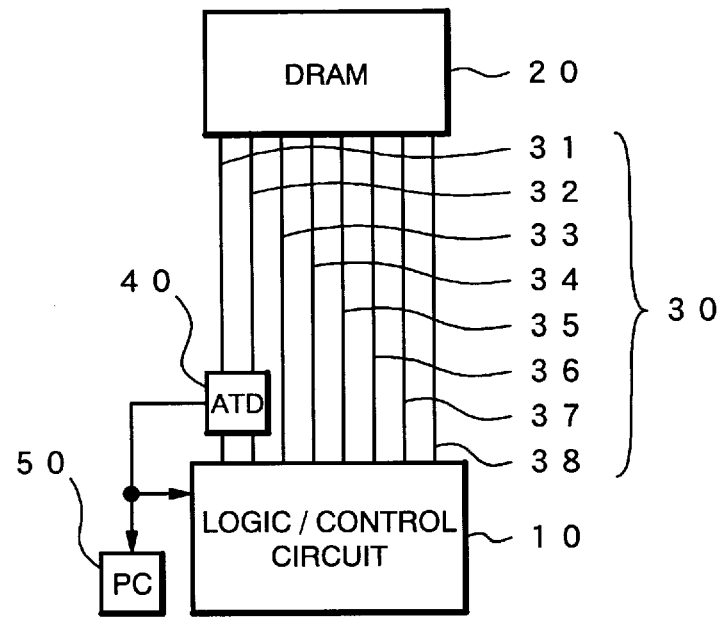
FIG. 1 is a block diagram showing structure of a memory access system according to a first embodiment of the present invention.

FIG. 1 is a block diagram showing structure of a memory access system according to a first embodiment of the present invention.

The memory access system of the present embodiment, as illustrated in the figure, includes a logic/control circuit 10, a DRAM 20, an address bus 30 which connects the logic/control circuit 10 and the DRAM 20, and an address transition detector circuit 40 (hereinafter referred to as ATD circuit) provided at a part of address lines constituting the address bus 30.

The address bus 30 is composed of 8-bit address lines (8 lines) 31–38, of which the 6-bit address lines 33–38 are used for access through a column decoder, that is, access to a predetermined address involving no word line switching. The remaining 2-bit address lines 31 and 32 are used for access through a word decoder, that is, access to an address involving word line switching. Through the address lines 33–38, high-speed access using a page mode or an interleave mode is possible. On the other hand, such high-speed access is impossible through the address lines 31 and 32.

Although in this embodiment, an address bus is designed, as an example, to be 8-bit, of which 6-bit address lines and the remaining 2-bit address lines are allocated to high-speed an low-speed accesses, respectively, the number of bits of an address bus and allocation of address lines to each type of access are not limited thereto.

The ATD circuit 40 is interposed in the middle of the address lines 31 and 32. When access is conducted through the address lines 31 and 32, the circuit 40 detects it to send a detection signal to the logic/control circuit 10 and a program counter 50. Upon receiving a detection signal from the ATD circuit 40, the logic/control circuit 10 and the program counter 50 stop operations until the memory access is completed. Here, the logic/control circuit 10 and the program counter 50 stop operating for period of time preset in consideration of a time required for low-speed memory access and automatically resume operation after a lapse of the set time.

When data reading is conducted, the DRAM 20 holds an address used in an immediately preceding cycle until rewriting of the read data is completed to prevent destruction of the memory cell data.

The above-described structure makes it possible to distinguish high-speed memory access using a page mode, an interleave mode or the like from low-speed memory access for which these modes can not be used, to individually cope with low-speed access. With the entire system designed to be adapted to high-speed access, an average processing speed of the whole system can be improved without increasing load on a program or a compiler by the waiting of the logic/control circuit 10 and the program counter 50, when low-speed access is to be conducted, for the end of low-speed access in response to a detection signal from the ATD circuit 40. In addition, since waiting of the logic/control circuit 10 and the program counter 50 is executed by temporary stoppage of the operation of these units, power consumption is reduced. The present invention is therefore more effectively utilized in a battery-driven portable electronic equipment to which the amount of power consumption is vital.

Although the ATD circuit 40 is provided on the address lines 31 and 32 of the address bus 30 between the logic/control circuit 10 and the DRAM 20 in this embodiment, it is also possible, without physically providing a circuit block, to detect low-speed memory access as the function of the logic/control circuit 10 or the DRAM 20 by using an address output buffer in the logic/control circuit 10 or an address input buffer in the DRAM 20.

Figure 2:
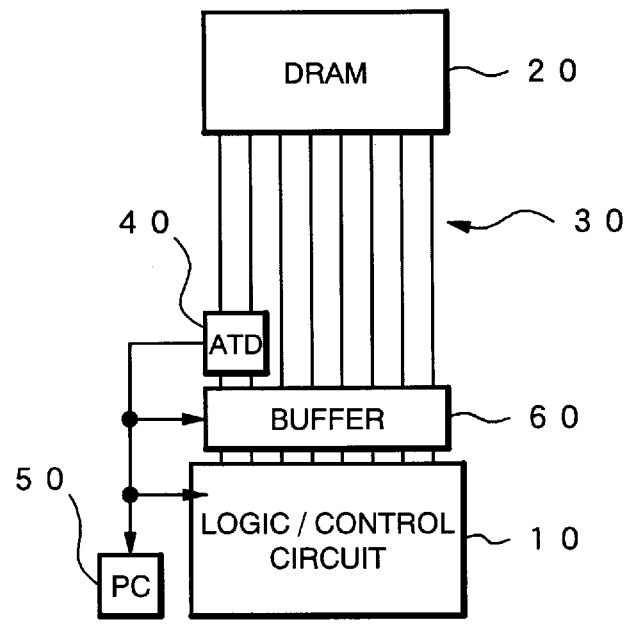
FIG. 2 is a block diagram showing structure of a memory access system according to a second embodiment of the present invention.

FIG. 2 is a block diagram showing structure of a memory access system according to a second embodiment of the present invention.

As illustrated in the figure, the memory access system of the present embodiment includes a logic/control circuit 10, a DRAM 20, an address bus 30 which connects the logic/control circuit 10 and the DRAM 20, an ATD circuit 40 provided at a part of address lines constituting the address bus 30, and an instruction pooling buffer 60 provided on the address lines constituting the address bus 30 for pooling memory access signals from the logic/control circuit 10.

Since the logic/control circuit 10, the DRAM 20, the address bus 30 and the ATD circuit 40 are the same as those described in the above first embodiment, the same reference numerals are allotted thereto to omit their description.

Upon receiving a detection signal indicating that low-speed access has been conducted from the ATD circuit 40, the buffer 60 pools memory access signals generated thereafter. The pooled memory access signals are sent to the DRAM 20 after the previous low-speed access is completed and the logic/control circuit 10 resumes its operation.

When the logic/control circuit 10 stops operation in response to the detection signal from the ATD circuit 40, the circuit 10 will resume its operation as soon as the low-speed access is completed. At this time, if there is another memory access signal generated during a period from, for example, when the logic/control circuit 10 generates a memory access signal requesting low-speed access until when it stops operating in response to the detection signal from the ATD circuit 40, the memory access signal will be lost when the logic/control circuit 10 resumes its operation. The instruction pooling buffer 60 is therefore provided between the logic/control circuit 10 and the DRAM 20 to pool memory access signals generated after the reception of a detection signal from the ATD circuit 40, thereby avoiding loss of the memory access signals when the logic/control circuit 10 resumes its operation.

Figure 3:
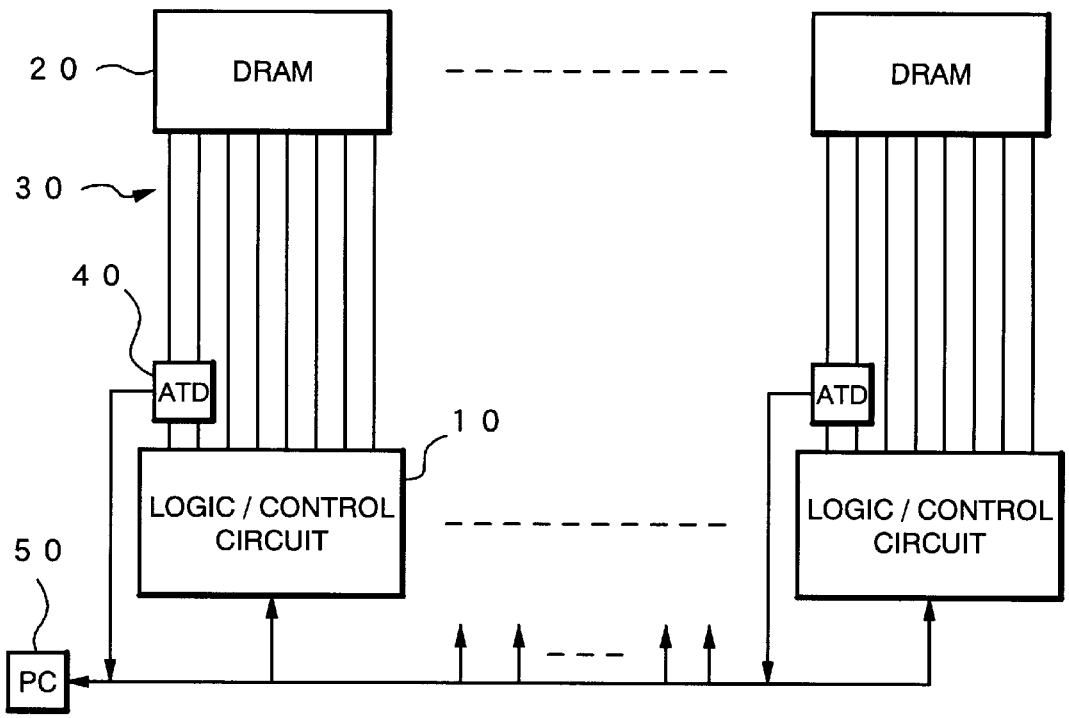
FIG. 3 is a block diagram showing structure of a memory access system according to a third embodiment of the present invention.

FIG. 3 is a block diagram showing structure of a memory access system of a third embodiment of the present invention.

As illustrated in the figure, the memory access system of the present embodiment is made up of a plurality of combinations provided in parallel of the logic/control circuit 10, the DRAM 20, the address bus 30 and the ATD circuit 40 which are similarly structured to those of the above-described first embodiment. Since function of each unit is the same as its counterpart in the first embodiment, the same reference numeral is allotted to the same part to omit its description.

In this embodiment, upon detecting generation of a memory access signal requesting low-speed access through the address lines 31 nd 32, each ATD circuit 40 provided on each address bus 30 outputs a detection signal to all the logic/control circuits 10. As a result, when any of the plurality of the logic/control circuits 10 generates a memory access signal requesting low-speed access, all the logic/control circuits 10 stop operating until the access is completed.

Such control is necessary to avoid erroneous operation control of the entire system including a plurality of logic/control circuits 10, which erroneous control might be caused by certain processing conducted when only one predetermined logic/control circuit 10 stops operating for waiting for the end of low-speed memory access. This control is effective for index addressing based on the single instruction multiple data system (SIMD System) in which all the logic/control circuits 10 execute the same instruction for different data accesses, as disclosed in, for example, Yamashita, et al., 1994 IEEE International Solid State Circuits Conference Digest of Technical Papers, Vol. 37, FA15.2, pp. 202.

Figure 4:
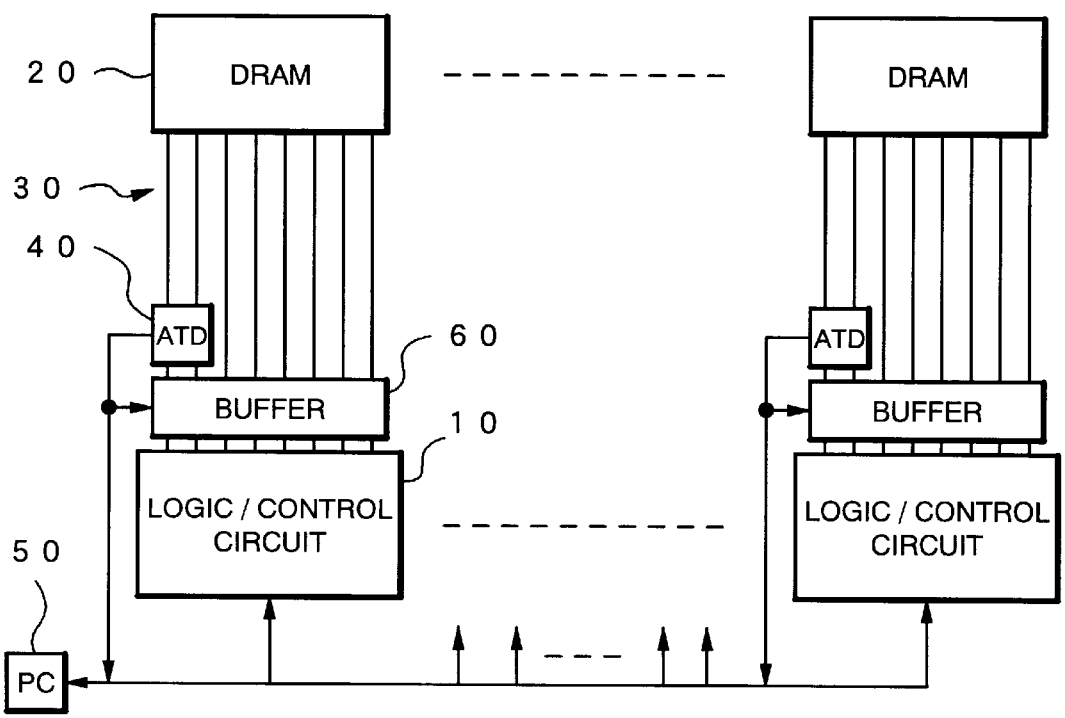
FIG. 4 is a block diagram showing structure of a memory access system according to a fourth embodiment of the present invention.

FIG. 4 is a block diagram showing structure of a memory access system according to a fourth embodiment of the present invention.

As illustrated in the figure, the memory access system of the present embodiment is made up of a plurality of combinations provided in parallel of the logic/control circuit 10, the DRAM 20, the address bus 30, the ATD circuit 40 and the instruction pooling buffer 60 which are similarly structured to those of the above-described second embodiment. Since function of each unit is the same as its counterparts in the first and the second embodiments, the same reference numeral is allotted thereto to omit its description.

Similarly to the above-described third embodiment, each ATD circuit 40 in this embodiment, upon detecting generation of a memory access signal requesting low-speed access through the address lines 31 nd 32, outputs a detection signal to all the logic/control circuits 10. As a result, when any of the plurality of the logic/control circuits 10 generates a memory access signal requesting low-speed access, all the logic/control circuits 10 will stop operating until the access is completed. Then, after all the buffers 60 receive detection signals from the ATD circuits 40, each buffer 60 pools a memory access signal generated from its corresponding logic/control circuit 10.

Figure 5:
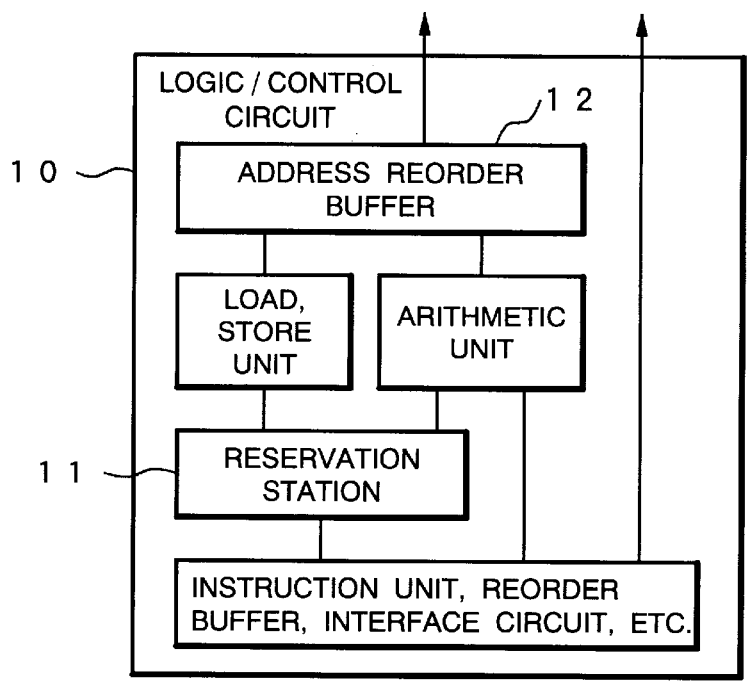
FIG. 5 is a block diagram showing structure of a logic/control circuit in a memory access system according to a fifth embodiment of the present invention.

FIG. 5 is a block diagram showing structure of a memory access system according to a fifth embodiment of the present invention.

The memory access system of the present embodiment has the same structure as that of the first embodiment. A shown in FIG. 5, the system further includes in the logic/control circuit 10, a reservation station 11 for reserving addresses for generating memory access signals and an address reorder buffer 12 for reordering generation of memory access signals.

Since recent processor units have improved processing capacities with a plurality of arithmetic units installed therein for parallel processing of instructions, as is recited in, for example, Linley Gwennap, "Intel's P6 Uses Decoupled Superscalar Design", Micro Processor Report, Feb. 16 1995. Then, instructions are resequenced inside the MPU for more efficient parallel execution of instructions. Using this technique, memory access instructions are once reserved in the reservation station 11 of the logic/control circuit 10 and memory access instructions are reordered by the address reorder buffer 12 so as to minimize access to memory cells involving address line change. Reordering of memory access instructions by the address reorder buffer 12 is carried out by scanning address bits allocated to memory access instructions for use in access involving alteration of address lines and then grouping and arranging memory access instructions in group which are allocated to the same address bit. This enables sequential transmission of access instructions which are accessible without alteration of an address line.

As a result, the number of accesses involving alteration of an address line, that is, low-speed accesses, can be reduced to further improve an average processing speed of the system as a whole.

It is apparent from FIG. 5 that the present embodiment is applicable not only to the logic/control circuit 10 of the first embodiment but also to the logic/control circuits 10 in the above-described second to fourth embodiments.

Figure 6:
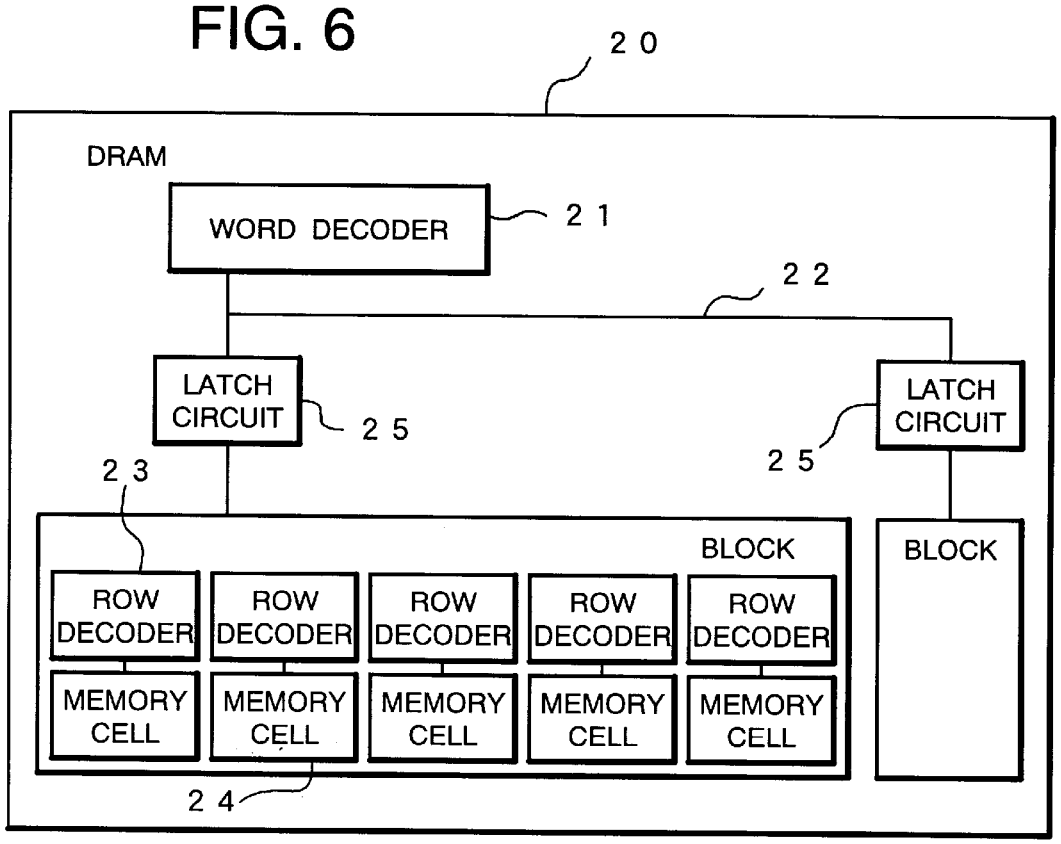
FIG. 6 is a block diagram showing structure of a DRAM in a memory access system according to a six embodiment of the present invention.

FIG. 6 is a block diagram showing structure of a memory access system according to a sixth embodiment of the present invention.

The memory access system of the present embodiment has the same structure as that of the first embodiment. As illustrated in FIG. 6, the system further includes in the DRAM 20, a word decoder 21, row decoders 23 and memory cells 24 connected to the word decoder 21 through a word line 22, and latch circuits 25 provided on the word line 22.

The row decoders 23 and the memory cells 24 are paired and five pairs constitute one block which is connected to the word line 22, which structure enables five ways of interleaving operation. In addition, the word line 22 is branched into two which are connected to two blocks. This enables access to the memory cells 24 in the two blocks without altering the word line 22. Within this range, high-speed memory access is possible by such means as interleaving operation or page mode operation.

Moreover, the latch circuits 25 enables search of row addresses belonging to different blocks. It is therefore possible to implement interleaving operation with respect to other blocks than the two blocks connected by one word line 22. As a result, a range of high-speed accessible memory cells can be expanded to improve a processing speed of the entire system.

It is also clear that the present embodiment, as illustrated in FIG. 6, is not only applicable to the DRAM 20 of the first embodiment but also to the DRAMs 20 in the above-described second to fourth embodiments.

The number of pairs of the row decoder 23 and the memory cell 24 in one block and the number of branches of the word line 22 are not limited to those illustrated as examples in the figure.

Although the present invention has been described with respect to the preferred embodiments in the foregoing, the present invention is not limited to the above embodiments. While in the respective embodiments, the address bus is set to be 8-bit, for example, of which 6-bit is used for high-speed access and the remaining 2-bit for low-speed access, different numbers of bits may be used.

In addition, it is possible in the third and fourth embodiments to set, with respect to each address bus which connects a plurality of logic/control circuits and memories, the number of bits of an address bus and a ratio of the number of address lines for use in high-speed access to the number of those for low-speed access.

As described in the foregoing, according to the present invention, when a memory access signal requesting low-speed access involving alternation of a word line is generated out of memory access signals transmitted through the address bus, the logic/control circuit stops operating until the access is completed to wait for the end of access, thereby individually coping with low-speed access even if the whole system is designed to be adapted to high-speed access involving no word line switching. An average processing speed of the system as a whole therefore can be improved.

In addition, since the logic/control circuit and the like stop operating to wait for the end of low-speed access, power consumption can be reduced, unlike a system in which a predetermined wait cycle is interleaved into a processing cycle to wait for it.

Moreover, the buffer provided on the address bus pools memory access signals generated after a detection signal is output from the ATD circuit, thereby avoiding loss of the memory access signals to prevent erroneous operation etc. resulted from such loss.

In a case of a system including a plurality of logic/control circuits, since transmitting a detection signal from the ATD circuit to all the logic/control circuits enables all the logic/control circuits to stop operating even when a memory access signal requesting low-speed access involving word line switching is generated from any of the logic/control circuits, erroneous control of the whole system caused by stoppage of operation of a part of the logic/control circuits can be prevented.

Moreover, reordering output of memory access instructions in the logic/control circuit leads to the reduction of the number of generation of memory access signals requesting low-speed access involving word line switching, whereby an average processing speed of the whole system can be further improved.

Provision of a latch circuit provided on a word line of a memory enables expansion of a range of memory cells which are accessible at a high speed by interleaving operation, thereby further improving an average processing speed of the whole system.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A memory access system comprising:

a logic/control circuit;

a memory;

an address bus connecting the logic/control circuit and the memory; and an address transition detector circuit provided on address lines constituting the address bus;

said address transition detector circuit detecting a memory access signal requesting memory access involving word line switching in said memory out of memory access signals transmitted from said logic/control circuit to said memory through the address lines and outputting a detection signal, and said logic/control circuit receiving input of a detection signal from said address transition detector circuit to temporarily stop its operation until the memory access is complete by achieving a waiting state only at a time when an address transition with the word line switching occurs at a random memory access of the memory.

2. The memory access system as set forth in claim 1, wherein said address bus includes:

a first address line for transmitting a memory access signal requesting memory access involving word line switching in said memory, and a second address line for transmitting a memory access signal requesting memory access involving no word line switching, and said address transition detector circuit detects a memory access signal transmitted through said first address out of the address lines constituting said address bus and outputs said detection signal.

3. The memory access system as set forth in claim 1, further comprising a plurality of combinations provided in parallel of said logic/control circuit, said memory, said address bus and said address transition detector circuit, said plurality of address transition detector circuits transmitting a detection signal to all of said logic/control circuits.

4. The memory access system as set forth in claim 1, further comprising a buffer provided on said address bus for receiving input of a detection signal from said address transition detector circuit and pooling memory access signals generated after the reception of the detection signal.

5. The memory access system as set forth in claim 1, further comprising a plurality of combinations provided in parallel of said logic/control circuit, said memory, said address bus, said address transition detector circuit and a buffer provided on said address bus for receiving input of a detection signal from said address transition detector circuit and pooling memory access signals generated after the reception of the detection signal, said plurality of address transition detector circuit transmitting a detection signal to all of said logic/control circuits and said buffers.

6. The memory access system as set forth in claim 1, wherein said logic/control circuit including:

a reservation station for reserving said memory access signals, and an address reorder buffer for reordering the memory access signals reserved in said reservation station to group memory access signals requesting memory access involving no word line switching in said memory.

7. The memory access system as set forth in claim 1, further comprising a plurality of combinations provided in parallel of said logic/control circuit, said memory, said address bus and said address transition detector circuit, wherein said plurality of address transition detector circuits each transmits a detection signal to all the logic/control circuits, and said plurality of logic/control circuits each includes:

a reservation station for reserving said memory access signals, and an address reorder buffer for reordering the memory access signals reserved in said reservation station to group memory access signals requesting memory access involving no word line switching in said memory.

8. The memory access system as set forth in claim 1, further comprising a buffer provided on said address bus for receiving input of a detection signal from said address transition detector circuit and pooling memory access signals generated after the reception of the detection signal, wherein said logic/control circuit includes:

a reservation station for reserving said memory access signals, and an address reorder buffer for reordering the memory access signals reserved in said reservation station to group memory access signals requesting memory access involving no word line switching in said memory.

9. The memory access system as set forth in claim 1, further comprising a plurality of combinations provided in parallel of said logic/control circuit, said memory, said address bus, said address transition detector circuit and a buffer provided on said address bus for receiving input of a detection signal from said address transition detector circuit and pooling a memory access signal generated after the reception of the detection signal, wherein said plurality of address transition detector circuits each transmits a detection signal to all of said logic/control circuits and said buffers, and said plurality of logic/control circuits each includes:

a reservation station for reserving said memory access signals, and an address reorder buffer for reordering the memory access signals reserved in said reservation station to group memory access signals requesting memory access involving no word line switching in said memory.

10. The memory access system as set forth in claim 1, wherein said memory includes a latch circuit provided on said word line.

11. The memory access system as set forth in claim 1, further comprising a plurality of combinations provided in parallel of said logic/control circuit, said memory, said address bus and said address transition detector circuit, wherein said plurality of address transition detector circuits each transmits a detection signal to all the logic/control circuits, and said plurality of memories each includes a latch circuit on said word line.

12. The memory access system as set forth in claim 1, further comprising a buffer provided on said address bus for receiving input of a detection signal from said address transition detector circuit and pooling memory access signals generated after the reception of the detection signal, wherein said memory includes a latch circuit provided on said word line.

13. The memory access system as set forth in claim 1, further comprising a plurality of combinations provided in parallel of said logic/control circuit, said memory, said address bus, said address transition detector circuit and a buffer provided on said address bus for receiving input of a detection signal from said address transition detector circuit and pooling a memory access signal generated after the reception of the detection signal, wherein said plurality of address transition detector circuits each transmits a detection signal to all of said the logic/control circuits and said buffers, and said plurality of memories each includes a latch circuit on said word line.

* * * * *